(12) United States Patent
Feng et al.

(10) Patent No.: US 10,913,205 B2
(45) Date of Patent: Feb. 9, 2021

(54) MATERIAL SETS

(71) Applicant: HEWLETT-PACKARD DEVELOPMENT COMPANY, L.P., Houston, TX (US)

(72) Inventors: Yi Feng, San Diego, CA (US); Jesiska Tandy, San Diego, CA (US); Rachael Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 248 days.

(21) Appl. No.: 16/074,492

(22) PCT Filed: Dec. 8, 2016

(86) PCT No.: PCT/US2016/065500
§ 371 (c)(1),
(2) Date: Aug. 1, 2018

(87) PCT Pub. No.: WO2018/106237
PCT Pub. Date: Jun. 14, 2018

(65) Prior Publication Data
US 2019/0054690 A1   Feb. 21, 2019

(51) Int. Cl.
| | | |
|---|---|---|
| C08F 2/46 | (2006.01) | |
| C08F 2/50 | (2006.01) | |
| C08G 61/04 | (2006.01) | |
| B29C 64/165 | (2017.01) | |
| B33Y 70/00 | (2020.01) | |
| B29C 64/314 | (2017.01) | |
| B33Y 40/00 | (2020.01) | |
| B33Y 10/00 | (2015.01) | |
| B29C 64/153 | (2017.01) | |
| B33Y 30/00 | (2015.01) | |
| B29C 64/20 | (2017.01) | |
| B29K 77/00 | (2006.01) | |
| B29K 105/00 | (2006.01) | |

(52) U.S. Cl.
CPC .......... *B29C 64/165* (2017.08); *B29C 64/153* (2017.08); *B29C 64/20* (2017.08); *B29C 64/314* (2017.08); *B33Y 10/00* (2014.12); *B33Y 30/00* (2014.12); *B33Y 40/00* (2014.12); *B33Y 70/00* (2014.12); *B29K 2077/00* (2013.01); *B29K 2105/251* (2013.01)

(58) Field of Classification Search
CPC ......... B33Y 30/00; B33Y 10/00; B33Y 70/00; B33Y 40/00; B29C 64/20; B29C 64/165; B29C 64/314; B29C 64/153; C08J 2377/06; C08J 2377/02; C08J 3/203
USPC ..................... 522/6, 189, 184, 71, 1; 520/1
See application file for complete search history.

(56) References Cited

U.S. PATENT DOCUMENTS

| | | |
|---|---|---|
| 6,309,060 B1 | 10/2001 | Timmermans-wang et al. |
| 2006/0189784 A1* | 8/2006 | Monsheimer ......... C08L 53/005 528/323 |
| 2009/0236775 A1 | 9/2009 | Monsheimer |
| 2013/0274435 A1 | 10/2013 | Diekmann et al. |
| 2016/0167304 A1 | 6/2016 | Diekmann |
| 2016/0207324 A1 | 7/2016 | Gonzales et al. |

FOREIGN PATENT DOCUMENTS

| | | |
|---|---|---|
| EP | 2379640 A1 | 10/2011 |
| JP | 2006225664 | 8/2006 |
| JP | 2012514080 | 6/2012 |
| WO | WO-2016048380 A1 | 3/2016 |
| WO | WO-2016053248 | 4/2016 |
| WO | 2016072966 A1 | 5/2016 |
| WO | WO-2016099445 A1 | 6/2016 |

OTHER PUBLICATIONS

International Application No. PCT/US2015/054913, Filed on Oct. 9, 2015, "Particulate Mixtures", Huang et al.
International Application No. PCT/US2016/025975, Filed on Apr. 5, 2016, "Photosensitive Material Sets", Stasiak.
International Application No. PCT/US2016/027983, Filed on Apr. 15, 2016, "Composite Particulate Build Materials", Emamjomeh et al.
International Application No. PCT/US2016/032264, Filed on May 13, 2016, "Material Sets", Feng et al.
International Application No. PCT/US2016/032295, Filed on May 13, 2016, "Material Sets", Feng et al.
International Application No. PCT/US2016/032322, Filed on May 13, 2016, "Material Sets", Feng et al.

* cited by examiner

*Primary Examiner* — Jessica Whiteley
(74) *Attorney, Agent, or Firm* — Thorpe, North & Western LLP (57) ABSTRACT

A material set can include a powder bed material, including a polymer powder and a fusing agent. The polymer powder can have a particle size distribution having the following profile: D10 of 30 μm or more, D50 from 50 μm to 65 μm, and D90 of 100?m or less. Other parameters can include a melting point from 100° C. to 300° C., a processing window temperature of 20° C. or more, an energy density absorption of 20% or less, and a melt flow index from 10 cc to 80 cc at 10 minutes. The fusing agent can include an energy absorber capable of absorbing electromagnetic radiation to produce heat.

13 Claims, 3 Drawing Sheets

MATERIAL SETS

BACKGROUND

Various methods of 3-dimensional (3D) digital printing, which is a type of additive manufacturing, have continued to be developed over the last several years. Various methods for 3D printing have included heat-assisted extrusion, selective laser sintering, photolithography, as well as others. In general, 3D printing technology improves the product development cycle by allowing rapid creation of prototype models for reviewing and testing.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets, systems for printing 3-dimensional parts, and methods of formulating powder bed material. In an exemplary printing process, a thin layer of powder bed material, which includes polymer particles or powder and can further include other additive particulates, can be spread on a powder bed. A print head, such as a fluid jet print head, may then be used to print a fusing agent over portions of the powder bed corresponding to a thin layer of the three dimensional object to be formed. Then, the powder bed with the fusing agent applied to the powder bed can be exposed to an electromagnetic radiation source, e.g., typically the entire bed. The fusing agent present where the part is being formed may typically absorb more energy from the electromagnetic radiation than the unprinted powder. The absorbed electromagnetic radiation can then be converted to thermal energy, causing the printed portions of the powder to melt and coalesce. This forms a solid layer. After the first layer is formed, a new thin layer of polymer powder can be spread over the powder bed and the process can then be repeated to form additional layers until the 3-dimensional part is printed. In accordance with examples of the present disclosure, the powder bed material can be preheated prior to introduction to the powder bed, and furthermore, can be heated still further once on the powder bed.

In formulating a powder bed material for use in the 3-dimensional printing system described herein, several parameters can be considered. Such parameters can include infrared (IR) energy density absorption, melting point, and/or process window temperatures. Other parameters that can be considered include melt viscosity, selectivity, particle size distribution, powder flow, and recyclability. Thus, when formulating a powder bed material for use with the 3-dimensional printing systems described herein, a combination of some or all these parameters can be used to predict success in formulating such powder bed materials.

In accordance with this, the present disclosure is drawn to a material set including a powder bed material and a fusing agent. The powder bed material can include a polymer powder having various parameters, such as a particle size distribution having the following profile: D10 of 30 μm or more, D50 from 50 μm to 65 μm, and D90 to 100 μm or less (particle size values can be obtained using laser diffraction, such as by using Malvern Mastersizer S, version 2.18, wherein "particle size" refers to the diameter of spherical particles, or to the longest dimension of non-spherical particles). Other parameters can include properties such as melting point, which can be from 100° C. to 300° C., as well as processing window temperature, which can be 20° C. or more. Still other parameters can include, energy density absorption, which can be 20% or less, and melt flow Index, which can be from 10 cc to 80 cc. The fusing agent can include an energy absorber capable of absorbing electromagnetic radiation to produce heat. For example, the energy absorber can include a carbon black pigment, a near-infrared absorbing dye, a near-infrared absorbing pigment, a tungsten bronze, a molybdenum bronze, a metal nanoparticle, a conjugated polymer, or a combination thereof.

In another example, a 3-dimensional printing system can include a powder bed material including a polymer powder, a fluid jet printer, and a fusing electromagnetic radiation source. The fluid jet printer can include a fluid jet pen in communication with a reservoir of a fusing agent to print the fusing agent onto the powder bed. The fusing agent comprises an energy absorber capable of absorbing electromagnetic radiation to produce heat, and wherein the energy absorber comprises a carbon black, a near-infrared absorbing dye, a near-infrared absorbing pigment, a tungsten bronze, a molybdenum bronze, a metal nanoparticle, a conjugated polymer, or a combination thereof. The fusing electromagnetic radiation source can be set to expose the powder bed to infrared radiation having a peak from about 1050 nm to 1150 nm.

In another example, a method of preparing polymer build material can include admixing from 80 wt % to 99.9 wt % of a polymer powder with from 0.1 wt % to 20 wt % of an antioxidant, flow aid, or mixture thereof. The polymer powder can have a particle size distribution having the following profile: D10 of 30 μm or more, D50 from 50 μm to 65 μm, and D90 of 100 μm or less, an infrared energy density absorption of 20% or less; a melting point from 100° C. to 300° C., a processing window temperature 20° C. or more; an energy density absorption of 20% or less; and a melt flow index from 10 cc to 80 cc at 10 minutes.

In each of these examples, there are various more specific ranges that can also be implemented or other parameters considered. For example, the particle size distribution for D10 can be 30 μm to 45 μm, and the particle size distribution for D90 can be from 80 μm to 100 μm (with D50 remaining from 50 μm to 65 μm). The melting point of the polymer can be from 100° C. to 210° C. In another example, the processing window temperature can be 35° C. or more. In another example where the energy density absorption is not already specified, the polymer powder can have an energy density absorption of 20% or less. In some instances, the material set may exhibit an infrared energy density absorption selectivity of 3.5 or more (which is a ratio of fused polymer to unfused polymer as it relates to infrared energy density absorption). In another example, the polymer powder can be semi-crystalline or crystalline, and in still another example, the polymer powder can have an aspect ratio from 1:1 to 1:1.5, or be substantially spherical. The powder bed material can be recyclable for at least four build cycles with the addition of 30 wt % or less of fresh powder. Furthermore, the powder bed material can further include an anti-oxidant, a flow aid, or both. In certain examples, the polymer powder can be prepared as a polyamide-12 powder, a polyamide-11 powder, a polyamide-6, 13 powder, or composite of glass beads coated with a polyamide polymer.

Turning now to the specifics of various parameters that can be used to prepare powder bed material, as mentioned, infrared energy density absorption and/or selectivity, melting point, process window temperature, melt viscosity, particle size distribution, powder flow, and/or recyclability can be considered.

Infrared energy density absorption relates to powder bed material that has not been contacted with fusing agent. Selectivity, on the other hand, compares that infrared energy density absorption and compares it to that same material which has a fusing agent (with an energy absorber therein) applied thereto (as a ratio of fused to unfused powder). A powder bed material with good selectivity can be highly infrared energy density absorptive when the fusing agent is applied, but at the same time, does not absorb infrared energy very efficiently on unprinted areas of the powder bed. Stated another way, a selectivity can be defined as the ratio of infrared energy density absorbed by a fused powder layer (or printed part area) to the energy density absorbed by an un-fused powder bed material area. A higher selectivity (or lower infrared absorption of un-printed powder) can be beneficial, and usually gives a better part quality in terms of mechanical properties, accuracy, surface finish, and improves powder recyclability. The infrared energy absorbed to form a fused powder layer can be predominantly determined by the fusing agent jetted on the powder bed material. Thus, in order to increase the selectivity of the polymer of the powder bed material, the selection and preparation of materials that minimize the absorption of infrared energy by powder bed material in unprinted areas can provide a better or higher selectivity value.

In accordance with one example of the present disclosure, the infrared emission spectra from a heating lamp in a Multi-Jet Fusion Printer from Hewlett-Packard may be centered at about 1100 nm, e.g., from 1050 nm to 1150 nm or from 1090 nm to 1110 nm. Thus, in this example, minimizing infrared absorption near 1100 nm by the powder bed material can provide a desirable high selectivity. That being stated, as long as the infrared absorption profile in the near-infrared range is low, the color of powder bed material can vary, but white powders tend to work well in avoiding near-infrared absorption.

In further detail, infrared absorption percentages and selectivity ratio values can be calculated using integrated absorption energy from visible to 2.5 µm. The total infrared absorption for unfused powder can have a relatively low value, e.g., 20% or less; 3000K infrared emitter which has the emission peak around 1100 nm. With Multijet Fusion 3D printing, a powder material with a lower total infrared absorption can be desirable, as described, and thus a lower value can tend to have a higher selectivity, depending on the fusing agent/energy absorber used that is coupled with the powder bed material. A comparison of the unprinted areas with areas printed fusing agent can provide a selectivity for a specific powder bed material or polymer powder material used in combination with a specific fusing agent or energy absorber. For example, an area with the fusing agent may exhibit an infrared absorption of 70% or more, and the unprinted area may exhibit an infrared absorption of 20% or less. Thus, a selectivity in this example would be 3.5 or greater (based on the lower limit of the fused area of 70% and the upper limit of the unfused area of 20%, i.e. 70:20 ratio). In another example, the selectivity ratio can be 4 or more, 4.5 or more, or 5 or more. By considering the powder bed material (with the polymer particles or polymer composited particles used) and the fusing agent (with the energy absorber used), selectivity can be measured by comparing the energy absorption within the printed area and outside of the printed area (3000K infrared emitter at an emission peak at about 1100 nm used to test the selectivity and the selectivity ratio).

Other parameters that can be considered may be related to temperature, such as powder bed material melting point and processing window temperatures. Powder bed 3-dimensional printing, such as Multi-Jet Fusion printing from Hewlett-Packard, can be used with materials with modest to high melting points. In one example, the melting point of the polymer, e.g., thermoplastic, thermoplastic elastomers, composites including thermoplastics or thermoplastic elastomers with glass or other materials, etc., can be from about 100° C. to about 300° C., or from about 100° C. to about 210° C., or from about 130° C. to about 200° C.

With respect to processing window temperature, the difference in temperature between a powder bed material melting peak and crystallization peak in a DSC measurement cycle, i.e., in a constant heating ramp and a cooling ramp, can also be used to prepare or formulate a suitable powder bed material. In one example, the process window can be used to define a maximum allowable temperature variation within the build chamber of a 3-dimensional printer when this material is used to print parts. If the temperature is outside this process window, one may either generate a warped part or generate caking of white powder. To avoid these issues, a wider process window can be considered for powder bed material formulation, as it can make it easier to control the temperature inside the build chamber. For a plastic powder, a good process window may be 35° C. or more. For elastomer or softer materials, a narrower process window may be used because these types of materials are not as prone to warping, e.g., 20° C. or more may be suitable in some examples.

Melt Viscosity is another property that can be considered when preparing powder bed material. For example, a low melt viscosity material is easy to flow once molten and it consolidates quickly. On the other hand, high melt viscosity materials usually provide better part ductility, which is also a desired attribute. That being stated, if the melt viscosity is too high, the melt flow and part consolidation can be slow in the 3-dimensional build process. In some cases, too high of a melt viscosity may result in a rough part surface, and sometimes visibly irregular surface defects can materialize. Thus, providing an acceptable melt flow index (MFI) can balance out some of these benefits and drawbacks.

Per the standardized ASTM D1238 procedure, MFI can be measured at about 40° C. to 50° C. above the melting point of the polymer. A desirable MFI for use in accordance with examples of the present disclosure can be in the range of 10 cc to 80 cc per 10 minutes under 5 kg of weight, or in the range of 10 cc to 80 cc per 10 minutes under 2.16 kg of weight. Thus, if the polymer falls within this 10 cc to 80 cc range (at 10 minutes) using any temperature within the range, e.g., 40° C. to 50° C. above the melting point, and at either weight pressure, e.g., 2.16 kg or 5 kg, then the MFI may be suitable for use in accordance with the present disclosure.

Semi-crystalline polymers, in some examples under this test, can have the following advantages over amorphous polymers: i) once above its melting point, a semi-crystalline polymer rapidly becomes a liquid and its low viscosity helps the material to fuse and consolidate into solid parts; and ii) when in powder form below the melting point, particles of a semi-crystalline polymer are less likely to clump together to form a hard cake even at an elevated temperature. As a result, though not necessarily always the case, semi-crystalline materials can be more desirable for use than amorphous materials.

With respect to the powder bed material while in its powder form, e.g., prior to fusing, these powder materials can have properties that facilitate effective transporting from powder supply compartment to a printed surface (and in some instances compacted before fusing). The powder material should also be able to provide a layer thickness suitable for use with the inkjet printing bars used to deposit fusing agent (and in some cases, detailing agent) on demand. Therefore, there are further properties that can be considered, including particle size, particle size distribution, and powder flowability.

Particle size and size distribution can be in the follow ranges. D10 can be from 30 μm to 45 μm; D50 can be from 50 μm to 65 μm; and D90 can be from 80 μm to 100 μm. "D10" is defined as the tenth-percentile by weight of powder that is below a given particle size. "D50" is defined at the median weight. "D90" is defined as the ninetieth-percentile by weight of powder that is below a given particle size. Particle sizes outside of these ranges can be used, but these particles size distributions have been found to be particularly suitable for 3-dimensional printing accordance with examples of the present disclosure.

Powder Flowability can also be considered. In one example, flowability can be enhanced when the particle shape is spherical or substantially spherical. Thus, in general, with everything else being equal, particles with more isotropic shape provide a better powder flow. However, some powders that have irregular shapes have been found to be compatible with the 3-dimensional printing systems described herein. Furthermore, powder flow can be improved with addition of flow aids. Those flow aids are typically metal or semi-metal oxides in a nano-size scale, e.g., from about 0.01 wt % to about 0.5 wt % having an average particle size from about 5 nm to about 200 nm. In one example, fumed silica can be used as the flow aid. In further detail, moisture absorption in powders in some cases causes powder clumping and poor powder flow. Adding flow aids sometimes will help to negate the effects of moisture. That being stated, issue related to moisture content in the powder may or may not impact the fusing process, but can have an impact on the powder manufacture, transport, and pre-fusing processes, e.g., filling powder cartridges, recycling and mixing powder, powder transport from powder supply compartment to the surface of printing platform, spreading of the powder on to printing surface, etc.

Another consideration can relate to recyclability. In a typical 3-dimensional printing job, e.g., using Multi Jet Fusion from Hewlett-Packard, approximately 10 wt % to 40 wt %, or about 20 wt %, of powder might be fused and consolidated into printed parts, and the rest of the powder stays in powder form. It can be a benefit to the user in reducing costs if part or all of the remaining powder can be re-used in subsequent printing jobs. For example, the "unused" powder can be recycled and mixed with some fresh powder for a subsequent build. Providing a powder build material with a good recyclability can be achieved using a polymer having a relatively stable molecular weight, color, particle size, and powder flowability (after being heated during the build process). Thus, when admixing the "used" powder with another portion of fresh powder, an acceptable product remains for re-use. Notably, other additives may be present in the powder build material other than the polymer, e.g., flow aid, antioxidants, or other stabilizing agents.

There are examples of raw polymer and other additives that can be used to prepare the powder bed materials of the present disclosure. Polymeric particles that can be used include a nylon or polyamide, a thermoplastic elastomer, a polystyrene, a polyacetal, a polyproplylene, a polyester, a polyether ketone, a polyurethane, an engineered plastic, a polyethylene, a polyethylene terephthalate, an amorphous polymer thereof, a blend thereof, or a core-shell composite thereof. In certain specific examples, the polymer material can be polyamide-11 (PA-11), polyamide-12 (PA-12), composite polyamides (e.g., glass beads coated with polymer), etc., can be used.

If using composite particles, there are several benefits to providing glass beads coated with the polymer of the present disclosure. For example, in some instances, if the polymer was added as a standalone powder admixed with the glass beads, glass bead/polymer particles segregation may occur in the powder bed. As the powder bed material is spread using a knife or roller, glass bead would interact with the spreading device differently than polymer powder, causing a less than homogenous mixture of glass beads and polymer at the surface. Additionally, glass beads with a much higher density than the polymer particles may tend to separate downward through the larger voids provided by larger particles. Polymer-coated glass beads as described herein can provide certain improved physical properties for the printed image, including but not limited to, elongation before the part breaks, as well as part strength and/or modulus. These improvements can be seen in the printed X-Y axis (horizontal axis aligned with printing layers).

In some examples, the polymer powder may also be capable of being formed into 3D printed parts with a resolution of 20 μm to 120 μm. As used herein, "resolution" refers to the size of the smallest feature that can be formed on a 3D printed part. Resolution can be improved within this range by using smaller particles within the range. The polymer powder can form layers from about 20 μm to about 150 μm thick, allowing the fused layers of the printed part to have roughly the same thickness. This can provide a resolution in the Z axis direction of about 20 μm to about 120 μm. The polyamide-12 powder can also have a sufficiently small particle size and sufficiently regular particle shape to provide about 20 μm to about 120 μm resolution along the x-axis and y-axis.

In one example, the polymer powder can have a white, translucent, or transparent appearance. When used with a colorless fusing agent, the powder build material can provide a printed part that is white, translucent, or transparent. In other examples, the powder bed material can be colored by adding colorant with the powder for producing colored parts. In still other examples, when the polymer powder is white, translucent, or transparent, color can be imparted to the part by the fusing agent or another colored fluid or ink.

The polymer powder can also, in some cases, be blended with an additive, such as filler, flow aids, anti-oxidant, reinforcing particles, dopant, and/or salt. The filler can include inorganic particles such as alumina, silica, glass, and/or other similar fillers. When the polymer powder fuses together, the filler particles can become embedded in the polymer, forming a composite material. In some examples, a free-flow, anti-caking material can be added, referred to collectively herein as a "flow aid." Such flow aids can prevent packing of the polymer powder, coat the powder particles and smooth edges to reduce inter-particle friction, and/or absorb moisture. In further detail, powder bed material with the polymer powder can be further modified with the inclusion of an anti-oxidant blended therewith. By reducing overall thermal degradation of the polyamide powder using a blended anti-oxidant powder, the reactivity of the end groups can be formulated to be less aggressively reactive, as some thermal degradation is reduced by the presence of the anti-oxidant. Other additives can include reinforcing particles, such as mica, talc, or glass. These can have various shapes, such as elongated fiber structures or flattened plate-like structures. wherein the inkjettable fluid includes the photosensitive dopant, and the material set further comprises a fusible ink that is separate from the inkjettable fluid. Still other fillers can include photosensitive dopant is blended with the polymer powder, e.g., p-diethylaminobenzaldehyde diphenylhydrazone, anti-9-isopropylcarbazole-3-carbal-dehyde diphenylhydrazone, or tri-p-tolylamine. Other additives still can include salts, such as sodium chloride, magnesium chloride, sodium aluminate, potassium nitrate, magnesium sulfate, sodium sulfate, calcium nitrate, or a mixture thereof. In some examples, a weight ratio of polymer powder to additive can be from 999:1 to 1:2, from 999:1 to 1:1, from 999:10:1, from 99:1 to 1:1, from 99:1 to 5:1, or from 5:1 to 1:1.

Material sets in accordance with the present technology can also include a fusing agent, which is typically a fluid that includes an energy absorbed dissolved or dispersed therein. The energy absorber can be capable of absorbing electromagnetic radiation to produce heat. The energy absorber can be colored or colorless. In various examples, the energy absorber can include carbon black, near-infrared absorbing dyes, near-infrared absorbing pigments, tungsten bronzes, molybdenum bronzes, metal nanoparticles, conjugated polymers, or combinations thereof.

Examples of near-infrared absorbing dyes include aminium dyes, tetraaryldiamine dyes, cyanine dyes, pthalocyanine dyes, dithiolene dyes, and others. In further examples, the energy absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

As mentioned, the energy absorber can include a conjugated polymer. As used herein, "conjugated" refers to alternating double and single bonds between atoms in a molecule. Thus, "conjugated polymer" refers to a polymer that has a backbone with alternating double and single bonds. In many cases, the energy absorber can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In some examples, the fusing agent can have a black or gray color due to the use of carbon black as the energy absorber. Thus, carbon black is good choice for use as an energy absorber when a colored part is intended, e.g., black or gray or other color mixed with black or gray. However, in other examples the fusing agent can be colorless or nearly colorless. The concentration of the energy absorber can be adjusted to provide a fusing agent in which the visible color of the fusing agent is not substantially altered by the energy absorber. Although some of the above described energy absorbers have low absorbance in the visible light range, the absorbance is usually greater than zero. Therefore, the energy absorbers can typically absorb some visible light, but their color in the visible spectrum can be minimal enough that it does not substantially impact the fusing agent's ability to take on another color when a colorant is added (unlike carbon black which dominates the fluid color with gray or black tones). The energy absorbers in concentrated form can have a visible color, but the concentration of the energy absorbers in the fusing agent can be adjusted so that the energy absorbers are not present in such high amounts that they alter the visible color of the fusing agent. For example, an energy absorber with a very low absorbance of visible light wavelengths can be included in greater concentrations compared to an energy absorber with a relatively higher absorbance of visible light. These concentrations can be adjusted based on a specific application with some experimentation. In one example, the energy absorber can have a concentration in the fusing agent such that after the fusing agent is printed onto the polymer powder, the amount of energy absorber in the polymer powder can be from 0.0003 wt % to 10 wt %, or from 0.005 wt % to 5 wt %, with respect to the weight of the polymer powder.

The amount of energy absorber in the fusing agent can vary depending on the type of energy absorber. In some examples, the concentration of energy absorber in the fusing agent can be from 0.1 wt % to 20 wt %. In one example, the concentration of energy absorber in the fusing agent can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %. In one example, the concentration of the energy absorber can be high enough that the energy absorber impacts the color of the fusing agent, but low enough that when the fusible agent is printed on the powder bed material, the energy absorber does not substantially impact the color of the powder. Thus, in this example, the concentration of the energy absorber can be balanced with the amount of fusing agent that is to be printed on the polymer powder so that the total amount of energy absorber that is printed onto the polymer powder is low enough that the visible color of the polymer powder is not impacted. That being mentioned, there may also be cases where the energy absorber is selected so that a deliberate color is provided to the printed part. Carbon black is an example of such an energy absorber.

The energy absorber can have a temperature boosting capacity sufficient to increase the temperature of the polymer powder above the melting or softening point of the polymer powder. As used herein, "temperature boosting capacity" refers to the ability of an energy absorber to convert electromagnetic radiation, e.g., infrared or near-infrared light energy, into thermal energy to increase the temperature of the printed powder bed material (containing the polymer powder) over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable more amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer powder coalesces in the presence of the energy absorber while the remaining powder remains separate and loose, typically suitably so for recycling. Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point. When the fusing agent is printed on a portion of the polymer powder, the energy absorber can heat the printed portion to a temperature at or above the melting or softening point, while the unprinted portions of the polymer powder remain below the melting or softening point. This allows the formation of a solid 3D printed part, while the loose powder can be easily separated from the finished printed part.

In accordance with examples of the present disclosure, the unused powder bed material, which includes the polymer powder, can be readily recycled for future part printing jobs. Because the polymer powder described herein is stable when exposed to heat, the powder bed material can be refreshed by adding only minimal amounts of fresh powder bed material. For example, by refreshing the powder bed material with as little as 30 wt %, 20 wt %, or 10 wt % fresh powder, the powder bed material can be heated or cooled (or build cycled) more than 4 times, more than 6 times, more than 8 times, or more than 10 times. Each instance of heating and cooling can be referred to as one "cycle." In one example, the powder can be cycled 10 times, only refreshing the powder using 20 wt % fresh powder added for each new cycle.

Returning to the energy absorber per se, the energy absorber can have a temperature boosting capacity from about 10° C. to about 70° C. for the polymer powder, which has a melting or softening point from about 170° C. to about 210° C. If the powder bed material is at a temperature within about 10° C. to about 70° C. of the melting or softening point, then such an energy absorber can boost the temperature of the powder bed material up to the melting or softening point, while the unprinted powder remains at a lower temperature. In some examples, the powder bed material can be preheated to a temperature from about 10° C. to about 70° C. lower than the melting or softening point of the polymer. The fusing agent can then be printed onto the powder bed material and the powder bed can be irradiated with electromagnetic radiation (suitable matched to the thermal excitation frequency of the energy absorber) to coalesce the printed portion of the powder.

In further examples, the material set can include colored fluids or inks for adding color to the thermoplastic polymer powder. The colored fluids or inks can include any suitable colorant, including dyes and/or pigments. This can allow for printing of full-color 3-dimensional parts. In one example, the material set can include cyan, magenta, yellow, and/or black inks in addition to the fusing agent and other fluids or inks, if present. Alternatively, even the fusing agent itself can include a pigment or dye colorant that imparts a visible color to the fusing agent. In still other examples, the colorant may also be the same as the energy absorber itself, e.g., carbon black.

In either example, whether the colorant is present in a separate fluid or in the fusing agent per se, the colorant can be present in an amount from 0.1 wt % to 10 wt % in the fluid, ink, or agent. In one example, the colorant can be present in an amount from 0.5 wt % to 5 wt %. In another example, the colorant can be present in an amount from 2 wt % to 10 wt %. In some examples, the colored inks can be used to print 3D parts that retain the natural color of the polymer powder, or a polymer powder that is already colored to some degree. Additionally, in one example, the fluid, inks, or fusing agent can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described fusing agent and/or inks, and thus ultimately, the printed part.

The components of the above described fluids, e.g., colored inkjet inks and fusing agents, can be selected to give the respective fluids good fluid jetting performance and the ability to fuse the polymer bed material and/or color the polymer powder with good optical density. Thus, these fluids can include a liquid vehicle. In some examples, the liquid vehicle formulation can include one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can include dispersants in an amount from 5 wt % to 20 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble energy absorber can be used with an aqueous vehicle. Because the energy absorber is dispersible or soluble in water, an organic co-solvent may not be present, as it may not be included to solubilize the energy absorber. Therefore, in some examples the fluids can be substantially free of organic solvent, e.g., predominantly water. However, in other examples a co-solvent can be used to help disperse other dyes or pigments, or improve the jetting properties of the respective fluids. In still further examples, a non-aqueous vehicle can be used with an organic-soluble or organic-dispersible energy absorber.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, one or more surfactant can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, as mentioned, various other additives can be employed to improve certain properties of the fluid compositions for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the fluid. From 0.01 wt % to 2 wt %, for example, can be used. Viscosity modifiers and buffers may also be present, as well as other additives to modify properties of the fluid as desired. Such additives can be present at from 0.01 wt % to 20 wt %.

Figure 1:
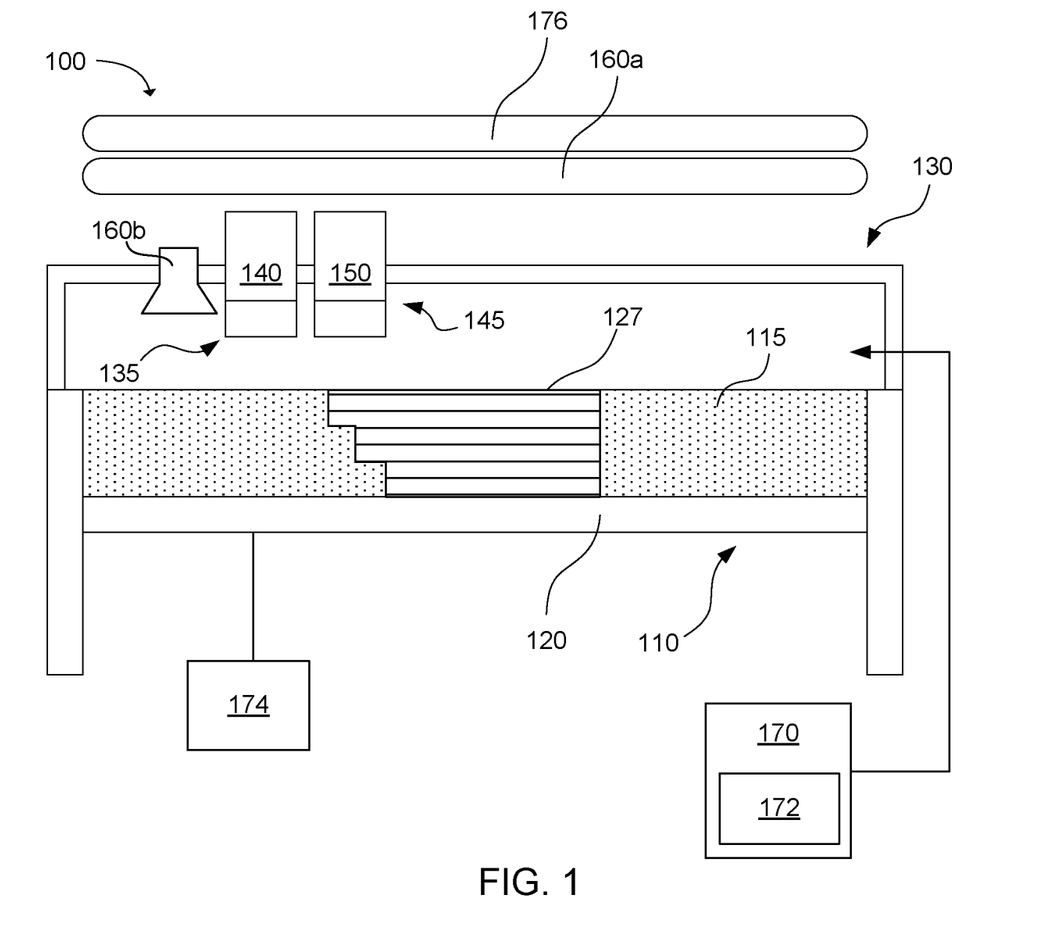
FIG. 1 is a schematic view of an example 3-dimensional printing system in accordance with the present disclosure.

In addition to the material sets described above, the present technology also encompasses 3-dimensional printing systems that include the material sets. An example of a 3-dimensional printing system is shown in FIG. 1. The system 100 includes a powder bed 110 including a powder bed material 115, which includes the polymer powder and has an average particle size distribution as described herein, e.g., D10 from 30 µm to 45 µm, D50 from 50 µm to 65 µm, and D90 from 80 μm to 100 μm. In the example shown, the powder bed has a build platform or moveable floor 120 that allows the powder bed to be lowered after each layer of the 3-dimensional part is printed. The 3-dimensional part 127 is shown after printing multiple layers of the fusing agent 140 on multiple layers of powder bed material. The system may also include a fluid jet printer 130 that includes a first fluid jet pen 135 in communication with a reservoir of the fusing agent. The first fluid jet pen can print the fusing agent onto the powder bed. A second fluid jet pen 145 can be in communication with a reservoir of a colored fluid or ink 150. The second fluid jet pen can print the colored ink onto the powder bed. In some examples, the 3-dimensional printing system can also include additional fluid jet pens in communication with a reservoir of fluid to provide other colors and/or functionality, or alternatively, a fluid to provide functionality can be used instead of the colored ink in the second fluid jet pen. For example, there may be a fluid jet pen that prints a detailing agent that works with the fusing agent to enhance the edge crispness of the printed part.

After the fusing agent 140 has been printed onto the powder bed material 115, a fusing electromagnetic radiation source, such as a fusing lamp, 160a or 160b can be used to expose the powder bed to electromagnetic radiation sufficient to fuse the powder that has been printed with the fusing agents. Fusing lamp 160a may be a stationary fusing lamp that rests above the powder bed, and fusing lamp 160b may be carried on a carriage with the fluid jet pens 135, 145. To print the next layer, the moveable floor is lowered and a new layer of powder bed material is added above the previous layer. Unused powder bed material, such as that shown at 115, is not used to form the 3-dimensional part, and thus, can be recycled for future use. Recycling can include refreshing the used powder bed material with a relatively small percentage of fresh powder bed material, e.g., as little as up to 30 wt % (1-30 wt %), up to 20 wt % (1-20 wt %), or up to 10 wt % (1-10 wt %).

To achieve good selectivity between the fused and unfused portions of the powder bed material, the fusing agents can absorb enough electromagnetic radiation or energy to boost the temperature of the thermoplastic polymer powder above the melting or softening point of the polymer, while unprinted portions of the powder bed material remain below the melting or softening point. Thus, as mentioned, the 3-dimensional printing system can include preheaters for preheating the powder bed material, and particularly the polymer powder, to a temperature near the melting or softening point. In one example, the system can include a preheater(s) to heat the powder bed material prior to printing. For example, the system may include a print bed heater 174 to heat the print bed to a temperature from 165° C. to 180° C., or from 170° C. to 175° C. The system can further include a supply bed or container 170 which may also include a supply heater 172 at a location where polymer particles are stored before being spread in a layer onto the powder bed 110. The supply bed or container can utilize the supply heater to heat the supply bed or container to a temperature from 140° C. to 160° C. Thus, when an overhead heating source 176, e.g., heating lamps, are used to heat up the powder bed material to a printing temperature, the typical minimum increase in temperature for printing can be carried out quickly, e.g., up to about 170° C. to 185° C., or even up to 230° C. To be clear, the overhead heating source used to heat the powder bed material for printing is typically a different energy source than the electromagnetic radiation source, e.g., fusing lamp 160a or 160b, used to thermally activate the energy absorber, though these energy sources could be the same depending on the energy absorber and powder bed material chosen for use.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing agents leaving the unprinted portions of the powder bed material below the melting or softening point.

In one example, the fusing lamp can be matched with the energy absorbers in the fusing agents so that the fusing lamp emits wavelengths of light that match the peak absorption wavelengths of the energy absorbers. In one example, the peak absorption can be from about 1050 nm to about 1150 nm, or about 1100 nm in a still more specific example. An energy absorber with a narrow peak at a particular infrared or near-infrared wavelength can be used with a fusing lamp that emits a narrow range of wavelengths at approximately the peak wavelength of the energy absorber. Similarly, an energy absorber that absorbs a broad range of near-infrared wavelengths can be used with a fusing lamp that emits a broad range of wavelengths. Matching the energy absorber and the fusing lamp in this way can increase the efficiency of coalescing the polymer particles with the energy absorber printed thereon, while the unprinted polymer particles do not absorb as much light and remain at a lower temperature. This relates to the infrared energy density absorption selectivity and recyclability described herein. Greater selectivity and recyclability can provide improved polymer powders in accordance with examples of the present disclosure.

Depending on the amount of energy absorber present in the polymer powder, the absorbance of the energy absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass, e.g., using one or multiple passes which can depend in part on the speed of a pass or passes.

Figure 2:
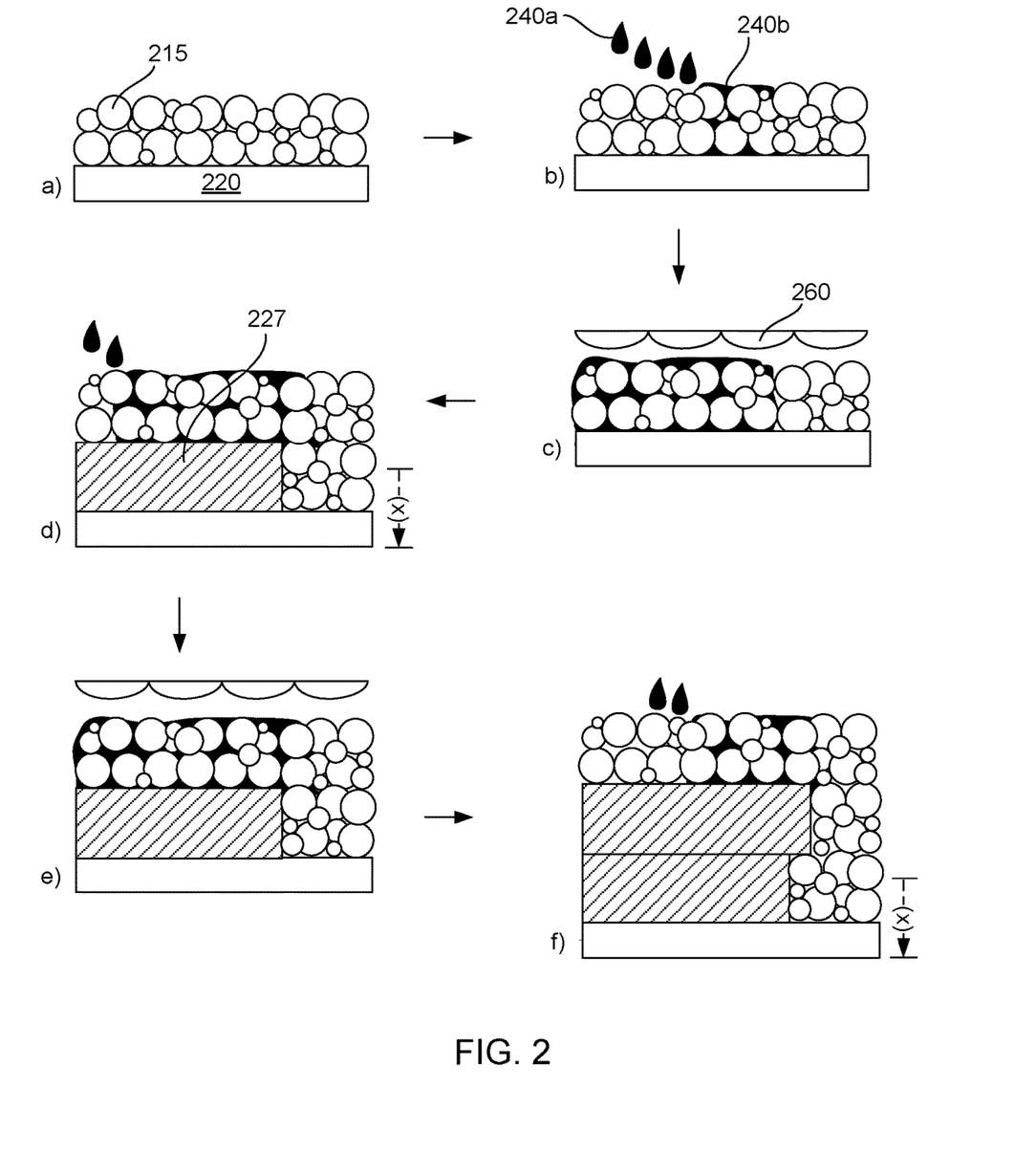
FIG. 2 is another schematic view of an example printing system in accordance with the present disclosure.

Turning now to the building a 3-dimensional part as described herein as well as material sets for building 3-dimensional parts, FIG. 2 provides a specific example of the present disclosure. It is noted that there are six steps shown (a-f) in FIG. 2 that exemplify aspects of the technology, but this is provided merely for convenience in describing the present technology. Fewer or greater number of steps can be carried out, as desired for a particular application. Further, for brevity, some steps in FIG. 2 are shown in aggregate. For example step d) in FIG. 1 shows multiple steps together, unlike the separated steps shown in steps a) to c). Additionally, similar structures shown in steps a) to f) are labeled with reference numerals once or twice, but such references are applicable throughout all of FIG. 2 for clarity if viewing and understanding the FIG.

With specific reference to FIG. 2, a) shows a build platform or movable floor 220, to which is deposited a thin layer of powder bed material 215 (which can include the polymer powder, anti-oxidant, fillers, etc.). Next, b) shows droplets of a fusing agent 240a as well as already deposited fusing agent 240b applied to and within a portion of the powder bed material. The fusing agent thus admixes and fills voids within the build material, as shown in c), where the fusing agent and powder bed material are fused to form a fused part layer 227, and the movable floor is moved downward a distance of (x) corresponding to a 3-dimensional fused part layer thickness (e.g., 20 µm to 150 µm) where the process if repeated, as shown in steps d) to f). In other words, the powder bed material in this example is spread thinly (20 µm to 150 µm) on the movable floor, combined with fusing agent, fused with electromagnetic energy, the moveable floor dropped, and the process repeated with the prior layer acting as the movable floor for the subsequently applied layer. As can be seen, the second fusible part layer of the "in progress" 3-dimensional part shown at f) is supported by the first fusible part layer as well as by some of the fused powder bed material where the second layer may hang out or cantilever out beyond the first layer. Once the 3-dimensional part is built, unfused powder bed material may be collected and reused or recycled as described herein. Notably, FIG. 2 does not show any of the heating mechanisms that may be present, including a heater for the movable floor, a heater for the powder bed material supply, or overhead heaters that likewise may also be present.

The 3-dimensional part prepared as described herein can be formed of multiple layers of fused polymer stacked in a Z axis direction. The Z axis refers to the axis orthogonal to the x-y plane. For example, in 3-dimensional printing systems having a powder bed floor that lowers after each layer is printed, the Z axis is the direction in which the floor is lowered. The 3-dimensional printed part can have a number of surfaces that are oriented partially in the Z axis direction, such as pyramid shapes, spherical shapes, trapezoidal shapes, non-standard shapes, etc. Thus, virtually any shape that can be designed and which can be self-supporting as a printed part can be crafted.

In further detail, and related to FIGS. 1 and 2, a 3-dimensional printed part can be formed as follows. A fluid jet printer can be used to print a first pass of fusing agent onto a first portion of the powder bed material. In some cases, there will be other fluid pens, such as colored inks or other functional fluids or detailing agents. This can be done on one pass, two passes, three passes, etc. (back and forth may be considered two passes). If the electromagnetic radiation source is not a bar that sits overhead (which can be left in an on position, or cycled to turn on and off at appropriate times relative to fusing agent application), but rather is associated with the printing carriage, a curing pass can then be performed by passing a fusing lamp over the powder bed to fuse the polymer powder with the fusing agent. Multiple curing passes may be used in some examples. Individual passes of printing and curing can be followed by further deposit of the powder bed material.

Figure 3:
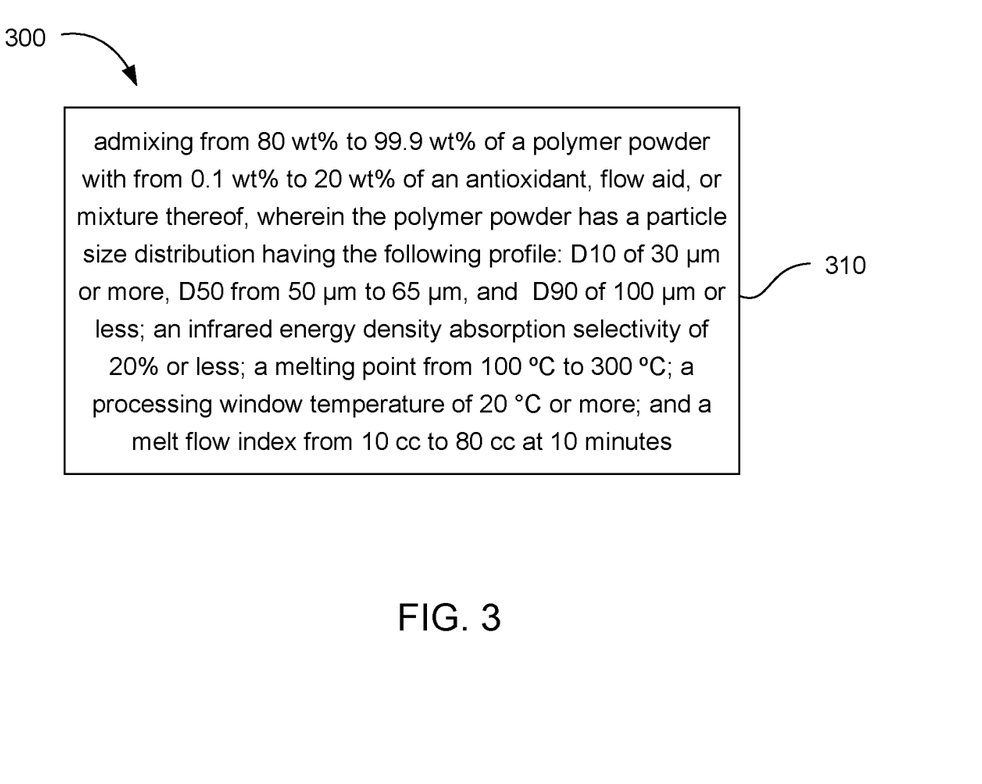
FIG. 3 is a flow chart depicting an example method of preparing a powder build material in accordance with the present disclosure.

With specific reference to the methods described herein, in FIG. 3, a method 300 of preparing a powder bed material can include a method of preparing polymer build material can include admixing 310 from 80 wt % to 99.9 wt % of a polymer powder with from 0.1 wt % to 20 wt % of an antioxidant, flow aid, or mixture thereof. The polymer powder can have a particle size distribution having the following profile: D10 of 30 µm or more, D50 from 50 µm to 65 µm, and D90 of 100 µm or less, an infrared energy density absorption selectivity of 20% or less; a melting point from 100° C. to 300° C., a processing window; temperature of 20° C. or more, and a melt flow index from 10 cc to 80 cc at 10 minutes.

It is noted that, as used in this specification and the appended claims, the singular forms "a," "an," and "the" include plural referents unless the context clearly dictates otherwise.

As used herein, "liquid vehicle" refers to a liquid in which additives are placed to form fluid jettable formulations, such as fusing agent, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and energy absorbers, the liquid vehicle can carry solid additives such as polymers, latexes, UV curable materials, plasticizers, salts, etc.

The term "fluid" herein does not exclude solid additives that may be suspended therein, as fluid generally includes both solutions and fine dispersions, such as in fusing agents, inks, functional fluids, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 0.1 wt %.

As used herein, "fluid jetting" or "jetting" refers to compositions that are ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLE

The following illustrates various examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Powder Bed Materials

Three polymer powders that are used to prepare powder bed materials were formulated, namely a PA-12 polymer powder; a PA-12 polymer and glass bead composite powder (60:40 by weight); and a PA6, 13 polymer powder.

TABLE 1

Polymer Powder Properties

| Polymer Powder used in Powder Bed Material | PA12 | PA12 + Glass bead composite (60:40 by wt) | PA6,13 | Methodology |
|---|---|---|---|---|
| % IR Absorption | 16.4 | — | — | See Below* |
| Selectivity (fused to unfused IR Absorption) | 5 | — | — | See Below* |
| Melting Point (° C.) | 186.5 | 186 | 212 | ASTM D3418 |
| Crystalization Point (° C.) | 143.5 | 152 | 176 | See Below** |
| Process Window (° C.) | 43 | 34 | 36 | ASTM D3418 |
| Melt Flow Index (cc/10 min) | 39.5 at 235° C./5 kg | 46.1 at 235° C./5 kg | 13 at 250° C./5.0 kg | ASTM D1238 |
| Particle Size (μm, D10/D50/D90) | 41/61/92 | 40/59/84 | 45/62/86 | Laser Diffraction |
| Flowing Agent | 0-5 wt % | 0-5 w % | 0-5 wt % | — |
| Antioxidant | 0-5 wt % | 0-5 w % | 0-5 wt % | — |

*In Table 1, infrared absorption and selectivity values were only determined for the PA12 polymer per se, and were calculated using integrated absorption energy from visible to 2.5 μm. The total infrared absorption for unfused powder was about 16.4% (3000K IR emitter which has the emission peak around 1100 nm). With Multijet Fusion 3D printing, a powder material with a lower total infrared absorption is desirable, and thus a lower value can tend to have a higher selectivity, depending on the fusing agent/energy absorber used that is coupled with the powder bed material. A comparison of the unprinted areas with areas printed fusing agent can provide a selectivity for a specific powder bed material or polymer powder material used in combination with a specific fusing agent or energy absorber. In this example, the area with the fusing agent exhibited an 82% infrared absorption, providing a ratio of 82 to 16.4, or a 5 selectivity for PA12 with this particular fusing agent composition, which included a carbon black as the energy absorber at a concentration of 4 wt % in the fusing agent fluid.
**With respect to crystallization, not all polymers that are useable in accordance with the present disclosure undergo crystallization, but those described in Table 1 do have a crystallization point that is reported therein. That being stated, amorphous polymers can be useful as well, particularly when they meet several of the other polymer parameters described herein.

In further detailed, the various parameters in Table 1 can be measured readily using the Methodology listed therein.

Example 2

Process Conditions and Mechanical Properties

The powder bed materials of Table 1 (with <2 wt % antioxidant and <1 wt % flow aid were tested for strength, elongation, and modulus along the X-Y axis (in line with the direction of the layers). The fusing agent used for the additive 3-dimensional printing included 4 wt % carbon black as the energy absorber, along with a suitable liquid vehicle for jetting the fusing agent onto the respective powder layers. Table 2 below provides the process settings used when printing from an HP Jet Fusion 3D Printer. Essentially, each sample prepared included fused layers which were printed at about a 80 μm thickness, and the respective strength, elongation at break, and modulus were measured for the X-Y axis, using a tensile test following a standard procedure as described in ASTM D638. Before carrying out the tensile testing protocol, all samples were pre-conditioned at 23° C. and 50% relative humidity for least 24 hours after being built. In the tensile test, a pull speed of 10 mm/min was applied and an extensometer was used to gauge the true strain of samples within the gauge length. The data for each test is shown in Table 2 below:

TABLE 2

Process Conditions and Mechanical Properties

|  | PA-12 | PA12 + Glass bead composite (60:40 by wt) | PA6,13 | Methodology |
|---|---|---|---|---|
| MJF Process Conditions |  |  |  |  |
| Supply Temperature (° C.) | 140 | 120 | 175 | — |
| Bed Temperature (° C.) | 167 | 167 | 195 | — |
| Fusing Agent Contone level | 64 | 80 | 64 | — |
| Fusing Speed (Inch/S) | 20 | 20 | 20 | — |
| Mechanical Properties |  |  |  |  |
| Tensile Strength (Mpa) | 45-50 | 31 | 55 | ASTM D638 |
| Tensile Modulus (Mpa) | 1700-1900 | 3000 | 2000 | ASTM D638 |
| Tensile Elongation (%) | 20-25 | 8 | 63 | ASTM D638 |

As can be seen in Table 2, the Tensile strength, Tensile Modulus, and the Tensile Elongation for each of these three materials were within an acceptable range for each property.

Another advantage of the powder bed materials relates to the recyclability (or reusability) of its un-used powder. These powders, in many instances, can exhibit a minimum change in its molecular weight after heat exposure, and allowing a user to add only a minimum amount, such as less than about 30 wt % of fresh powder to refresh used powder for continued use in the next four or more build cycles.

What is claimed is:

1. A material set, comprising:
   a powder bed material, including a semi-crystalline or crystalline polymer powder having:
      a particle size distribution having the following profile:
         D10 from 30 μm to 45 μm,
         D50 from 50 μm to 65 μm, and
         D90 from 80 μm to 100 μm,
      a melting point from 100° C. to 300° C.,
      a processing window temperature 20° C. or more,
      an energy density absorption of 20% or less, and
      a melt flow index from 10 cc to 80 cc at 10 minutes; and
   a fusing agent comprising an energy absorber capable of absorbing electromagnetic radiation to produce heat.

2. The material set of claim 1, wherein the melting point is from 100° C. to 210° C., and wherein the processing window temperature is 35° C. or more.

3. The material set of claim 1, wherein the polymer powder has an aspect ratio from 1:1 to 1:1.5.

4. The material set of claim 1, wherein the material set provides an infrared energy density absorption selectivity of 3.5 or more.

5. The material set of claim 1, wherein the powder bed material further includes an anti-oxidant, a flow aid, or both.

6. The material set of claim 1, wherein the energy absorber comprises a carbon black pigment, a near-infrared absorbing dye, a near-infrared absorbing pigment, a tungsten bronze, a molybdenum bronze, a metal nanoparticle, or a conjugated polymer, or a combination thereof.

7. A 3-dimensional printing system, comprising:
   a powder bed material, including a semi-crystalline or crystalline polymer powder having:
      a particle size distribution having the following profile:
         D10 from 30 μm to 45 μm,
         D50 from 50 μm to 65 μm, and
         D90 from 80 μm to 100 μm,
      a melting point from 100° C. to 300° C.,
      a processing window temperature 20° C. or more,
      an energy density absorption of 20% or less, and
      a melt flow index from 10 cc to 80 cc at 10 minutes; and
   a fluid jet printer comprising a fluid jet pen in communication with a reservoir of a fusing agent to print the fusing agent onto the powder bed, wherein the fusing agent comprises an energy absorber capable of absorbing electromagnetic radiation to produce heat, and wherein the energy absorber comprises a carbon black, a near-infrared absorbing dye, a near-infrared absorbing pigment, a tungsten bronze, a molybdenum bronze, a metal nanoparticle, a conjugated polymer, or a combination thereof; and
   a fusing electromagnetic radiation source to expose the powder bed to infrared radiation having a peak from about 1050 nm to 1150 nm.

8. The system of claim 7, wherein the polymer powder has an infrared energy density absorption of 20% or less.

9. The system of claim 7, wherein the semi-crystalline or crystalline polymer powder has a melting point is from 100° C. to 210° C., the processing window temperature of the polymer powder is 35° C. or more, and the polymer powder has an aspect ratio from 1:1 to 1:1.5.

10. A method of preparing a powder build material, comprising admixing from 80 wt % to 99.9 wt % of a semi-crystalline or crystalline polymer powder with from 0.1 wt % to 20 wt % of an antioxidant, flow aid, or mixture thereof, wherein the semi-crystalline or crystalline polymer powder has:
   a particle size distribution having the following profile:
      D10 from 30 μm to 45 μm,
      D50 from 50 μm to 65 μm, and
      D90 from 80 μm to 100 μm;
   an infrared energy density absorption selectivity of 20% or less;
   a melting point from 100° C. to 300° C.;
   a processing window temperature 20° C. or more; and
   a melt flow index from 10 cc to 80 cc at 10 minutes.

11. The method of claim 10, wherein the semi-crystalline or crystalline polymer powder is a polyamide-12 powder, a polyamide-11 powder, a polyamide-6, 13 powder, or a composite of glass beads coated with a polyamide polymer.

12. The method of claim 10, wherein the processing window temperature is 35° C. or more, the polymer powder is a thermoplastic polymer, the polymer, and the polymer powder has an aspect ratio from 1:1 to 1:1.5.

13. The material set of claim 1, wherein the powder bed material is the crystalline polymer powder.

* * * * *